United States Patent
Hozer et al.

(10) Patent No.: US 6,168,490 B1
(45) Date of Patent: Jan. 2, 2001

(54) BACK PANEL FOR A PLASMA DISPLAY DEVICE

(75) Inventors: Leszek Hozer, Lawrenceville; Kalipada Palit; Attiganal Narayanaswamy Sreeram, both of Plainsboro; Robert L. Quinn, Trenton; Ashok Narayan Prabhu, East Windsor, all of NJ (US)

(73) Assignees: Sarnoff Corporation; LG Electronics, Inc., both of Princeton, NJ (US)

( * ) Notice: Under 35 U.S.C. 154(b), the term of this patent shall be extended for 0 days.

(21) Appl. No.: 09/088,501

(22) Filed: Jun. 1, 1998

Related U.S. Application Data

(60) Provisional application No. 60/068,222, filed on Dec. 19, 1997.

(51) Int. Cl.[7] .................................................. H01J 9/24
(52) U.S. Cl. ................................................. 445/24; 501/32
(58) Field of Search ....................... 445/24, 25; 313/582; 501/32

(56) References Cited

U.S. PATENT DOCUMENTS

| | | |
|---|---|---|
| 1,898,251 | 2/1933 | Kopp . |
| 1,925,096 | 9/1933 | Hunter . |
| 4,777,092 | * 10/1988 | Kawakami et al. .................. 501/32 |
| 4,963,114 | 10/1990 | Andreadakis .......................... 445/25 |
| 5,212,121 | * 5/1993 | Omata et al. .......................... 501/32 |
| 5,675,212 | 10/1997 | Schmid et al. ....................... 313/422 |

FOREIGN PATENT DOCUMENTS

| | | |
|---|---|---|
| 0 008 782 A1 | 3/1980 | (EP) . |
| 0 527 352 A1 | 2/1993 | (EP) . |
| 1 417 998 | 12/1975 | (GB) . |
| 137534 | * 5/1989 | (JP) ...................................... 445/24 |
| WO 96 22949 | 8/1996 | (WO) . |
| WO 97 16383 | 5/1997 | (WO) . |
| WO 97 27035 | 7/1997 | (WO) . |
| 97/28554 | 8/1997 | (WO) . |

* cited by examiner

*Primary Examiner*—Kenneth J. Ramsey
(74) *Attorney, Agent, or Firm*—William J. Burke

(57) ABSTRACT

A plasma display having a transparent front panel spaced from a back panel which is a metal core having layers of a dielectric material extending over and bonded to the core. Conductive electrodes are on the surface of or imbedded in the dielectric layer of the back panel. The materials of which the back panel is made are chosen to form a back panel having a thermal coefficient of expansion compatible with that of the front panel. Barrier ribs are formed on the back panel by embossing the green tape before cofiring the bonded assembly. The green tape is embossed using pulsed pressure and an embossing tool that is formed by assembling embossing members and spacing members in compression. The embossing tool further includes elastic spacers mounted outside of the embossing tool and in a position such that the elastic spacers are held in compression during the embossing operation to aid in releasing the embossed green tape from the embossing tool after the embossing operation.

10 Claims, 3 Drawing Sheets

BACK PANEL FOR A PLASMA DISPLAY DEVICE

This application claims the benefit of U.S. Provisional Application No. 60/068,222 filed Dec. 19, 1997.

FIELD OF THE INVENTION

The present invention relates to a plasma display device and method of making the same, and, more particularly, to a plasma display in which the back panel is made of a metal core having layers of a dielectric material thereon and metal electrodes on and between the dielectric layers.

BACKGROUND OF THE INVENTION

A typical plasma display includes a front panel and a back panel both made of sheet glass (e.g. conventional float-glass). Electrical connections and mechanical structures are formed on one or both of the panels. For example, the back panel may have a ribbed structure formed on it such that the space between the ribs defines a single color pixel in a direct current (DC) display or column of single color pixels in an alternating current (AC) display. The color display pixel consists of three color pixels (red, green and blue). The ribs prevent optical cross-talk, that is to say, color from one pixel leaking into an adjacent pixel. Fabrication of these ribbed structures, called barrier ribs, poses a challenge both in the materials and manufacturing techniques that are used.

Plasma displays operate by selectively exciting an array of glow discharges in a confined rarefied noble gas. Full color displays are made by generating a glow discharge in a mixture of gases, such as He—Xe or Ne—Xe gas mixture to produce ultraviolet light. The ultraviolet light excites phosphors in the pixel cell, as defined by the barrier ribs, to produce light of desired color at the pixel position.

A typical plasma display back panel comprises a glass substrate having a plurality of substantially parallel, spaced first electrodes on a surface thereof. In AC displays, a thin layer of a dielectric material, such as a glass, may cover the electrodes. Barrier ribs are formed on the surface of the glass substrate between the first electrodes. The barrier ribs project from the surface of the substrate at a distance greater than the thickness of the first electrodes. Red, green and blue (R-G-B) phosphor layers overlie alternating columns of the first electrodes in the spaces between the barriers and also may overlie the walls of the barriers. A front transparent glass substrate, the front panel, with horizontal transparent electrodes overlies the rear panel and may rest on the barrier ribs so as to be spaced from the rear glass substrate by the barrier ribs.

Typically, the barrier ribs are walls which define troughs or channels on the back panel. Alternating current (AC) plasma displays typically have barriers that form the separators for the column pixels, and hence, have continuous vertical ribs on the back plate. By contrast, direct current (DC) plasma displays typically have ribbed barriers which isolate each single color pixel from all of its neighbors. Thus, for DC displays, the rib structure has a rectangular lattice-like layout. In either case, the desired resolution for the display device and its size determine the size of the ribbed barriers. In a typical display, the ribs are 0.1 to 0.2 mm in height, 0.03 to 0.2 mm wide and on a 0.1 to 1.0 mm pitch.

These barrier ribs may be formed separately from the back plate and attached using an adhesive or, as set forth in U.S. Pat. No. 5,674,634 to Wang et al., the barriers may be formed on the back plate by laminating a ceramic green tape to the back plate, sandblasting the green tape to form the channels between the barriers and then firing the back plate in a kiln to convert the green tape barriers into ceramic barriers.

The front panel includes an array of substantially parallel, spaced second electrodes on its inner surface. These second electrodes extend substantially orthogonally to the first electrodes. A layer of a dielectric material, typically glass, covers the second electrodes. A layer of MgO covers the dielectric layer. Voltages applied to the electrodes in the proper manner excite, maintain and extinguish a plasma in the gas within the region formed by the barriers. Addressing of individual pixels is done using external circuitry at the periphery of the panel. Barrier structures are typically used to confine the discharge to the addressed pixel, eliminating both electrical and optical cross talk between adjacent pixel elements. The columns of pixels are separated by the barriers, and the first electrodes are arranged beneath the gaps between the barriers. In a DC plasma display, the electrodes are not covered with glass or MgO, and the barrier structures are typically crossed, providing a box-like structure at each pixel element.

Although the structure described above provides a plasma display having satisfactory operating conditions, it does not solve certain problems. One problem arises from the fact that the materials used to form the back panel are desirably mutually compatible and compatible with the glass plate used for the front panel. In particular for the case of the metal-ceramic composite used as the back panel, the thermal expansion coefficient of the ceramic formed from the green tape should match the thermal expansion coefficient of the metal backing of the back panel and the thermal expansion coefficient of the composite back panel should match that of the front panel glass. This is to prevent the breaking of the seal which secures the back panel to the front panel during its operation.

SUMMARY OF THE INVENTION

The invention is a method for forming a back panel for a plasma display device comprising the steps of preparing a green ceramic tape which has a temperature coefficient of expansion (TCE) which matches the TCE of a metal core; cutting the prepared green tape to form a plurality of green tape blanks; laminating the green tape blanks; embossing the laminated green tape using an embossing die by applying pulsed pressure to the embossing die to form barrier ribs on the green tape ceramic; and cofiring the bonded formed green ceramic tape and metal core to form the back panel.

The invention is also a back panel for a plasma display device comprising a metallic core having a temperature coefficient of expansion (TCE); a ceramic structure bonded to the metallic core, the ceramic structure having a TCE that matches the TCE of the metallic core, the ceramic structure having a formulation a Glass 1 between about 92 and 95 percent weight and Forsterite between about 5 and 8 percent weight, wherein Glass 1 has a formulation defined by percent weight as ZnO between about 15 and 50 percent weight, MgO between about 10 and 45 percent weight, $B_2O_3$ between about 5 and 30 percent weight, and $SiO_2$ between about 10 and 45 percent weight.

DETAILED DESCRIPTION

To improve the processing of plasma displays, a type of plasma display has been developed wherein the back panel comprises a core plate of a metal and layers of a dielectric material extending over, and bonded to the core plate. On the surfaces of the dielectric layers and between the dielectric layers are metal strips forming the various electrodes. This back panel is made by forming thin green tape layers of a dielectric material and coating the surfaces of at least some of the green tape layers with metal strips or conductive ink which form the electrodes. The green tape layers are placed on the surface of the core plate and the assembly is laminated using a bonding glass, embossed to form barrier ribs and then fired at a temperature at which the green tape layers fuse together and bond to the core plate.

Figure 1:
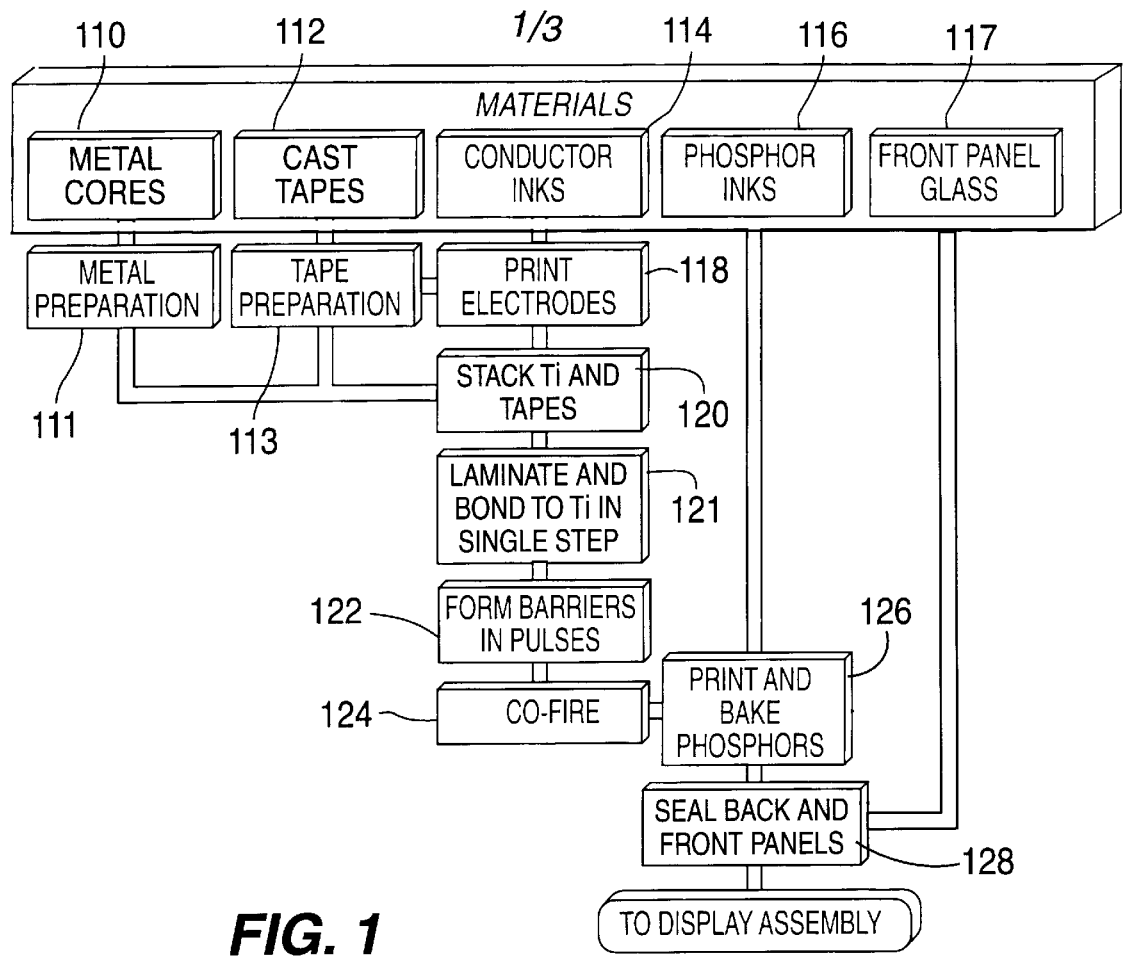
FIG. 1 is a flow chart showing the method of making the back panel of the present invention.

A plasma display according to the present invention includes a front panel made from glass, such as a float glass which has a thermal expansion coefficient of about $8.5 \times 10^{-6}/°$ C., it is desirable that the back panel have a thermal coefficient of expansion compatible with that of the front panel. This prevents disrupting the seal between the back panel and the front panel during the operation of the display. For a back panel which comprises a metal core plate having layers of a ceramic material bonded thereto, novel materials and a novel materials processing system are used to ensure that the back panel is compatible with the glass front panel. FIG. 1 shows the various steps used to form a back panel according to the present invention.

Briefly, the components of the back panel are a metal core 110, ceramic green tapes 112, conductor inks 114 and phosphor inks 116. The other component of the plasma display is the float-glass front panel 117. As described below, the metal core 110 of the back panel may be formed from metallic titanium. The ceramic green tape 112 is made as described below with reference to FIG. 2. The preparation of the conductor inks is also described below. The phosphor inks may be any of a number of commonly available preparations, such as those used to apply red, green and blue phosphors to cathode ray tubes (CRTs).

The first step in the process, step 111 is the preparation of the metallic substrate. At this step, the titanium core is coated with a bonding glaze. This glaze inhibits oxidation of the titanium and aids in forming a mechanical bond between the titanium and the ceramic in the fired back panel. In the exemplary embodiment, the titanium substrate is coated with a predetermined amount of a lead-based glaze having a relatively low melting point. One exemplary glaze is Hommel F-92 which is manufactured by O. Hommel Company, 235 Oak Street, Carnegie, Pa. and which is a lead borosilicate glass ($PbO$-$B_2O_3$-$SiO_2$). The upper limits on the ingredients given by the vendor are boron oxide of 15 weight percent, lead monoxide 80 weight percent, and silicon dioxide of 15 weight percent. We believe that the useful ranges for the components of the lead borosilicate glass in this application is boron oxide between about 10 and 15 weight percent, lead oxide between about 70 and 80 weight percent, and silicon dioxide between about 10 and 15 weight percent.

In the exemplary embodiment, the glaze is a glass powder suspended in an organic liquid at a known concentration. The glaze is sprayed onto the titanium substrate such that a known amount of the glass powder is applied to the substrate, for example, 10 mg/inch$^2$. The coated substrate is then pre-flowed in a furnace at a controlled temperature, for example, having a peak firing temperature of 550° C.

At step 113, the green tape is prepared. This step involves cutting the cast tape into blanks that will be laminated and embossed to form the back plate structure. These blanks are also punched to form vias in this step.

The next step in the process, step 118, prints the electrodes and fills vias on the green tapes using a conductive fill paste, the composition of which is described below. The electrodes and conductive traces may be printed on several layers of the green tape, as described below, and interconnected using the filled. These electrodes and vias allow the ceramic structure formed from the fired green tape to include the electrical connections between the pixel cells and driving electronics, mounted, for example, along the edges of the display.

The next step in the process, step 120, is to stack the various green tape layers on the titanium core. In the exemplary embodiment, because vias are formed through at least some of the green tape layers, it is desirable to precisely align the various green tape layers before they are laminated.

At step 121, the stacked layers are laminated and bonded to the titanium substrate. In the exemplary embodiment, the ceramic green tape may be laminated using a pressure of approximately 40 Kg/cm$^2$ and a lamination temperature of approximately 90° C.

At step 122, the green tape is embossed to form the barrier ribs. In the exemplary embodiment, the barrier ribs are formed after the green tape is attached to the metallic core using a die which has a shape that is the inverse of the desired shape of the back plate. The embossing step is described below with reference to an exemplary embossing tool, shown in FIG. 3A. At step 124, the combination of the metallic core and shaped green tape are co-fired at a peak temperature of between about 750° C. and 900° C. After the co-fired back panel has cooled, the phosphor stripes are printed between the column barrier ribs and the back panel is baked to affix the phosphors. The application of the phosphors and the baking used to affix them may be any of a number of conventional processes commonly used to affix phosphors, for example, to CRT screens.

At step 128, the front panel is affixed to the back panel that was painted and baked in step 126. In the exemplary embodiment, the front panel may be attached by applying a frit material around the border of the back panel at which the front panel is to be attached, placing the front panel onto the back panel and firing the combined front and back panels to cause the frit material to melt and seal the front panel to the back panel.

As described above, the thermal coefficient of expansion (TCE) of the metal core plate should be matched to that of the front panel. It is desirable to use soda-lime float glass (TCE about $8.5 \times 10^{-6}/°$ C.) for the front panel because of its low cost. A metal with this TCE, or other arbitrary value, can generally be synthesized by laminating of different metals, e.g., Cu—Mo—Cu. In this laminate, the outer metal has a TCE that is different from the TCE of the inner metal, and the laminate takes on a TCE value intermediate between the two. The exact value depends on the relative thickness and other properties of the different layers. However, it is more convenient to chose an existing metal or alloy that meets the TCE requirement. One exemplary material is metallic titanium, which has a TCE of $8.5 \times 10^{-6}/°$ C. Titanium is a rugged material, with the highest strength to weight ratio of any metal or metal alloy. Titanium is an abundant metal, readily available in vary large sheet form, moreover, it is relatively inexpensive.

Figure 2:
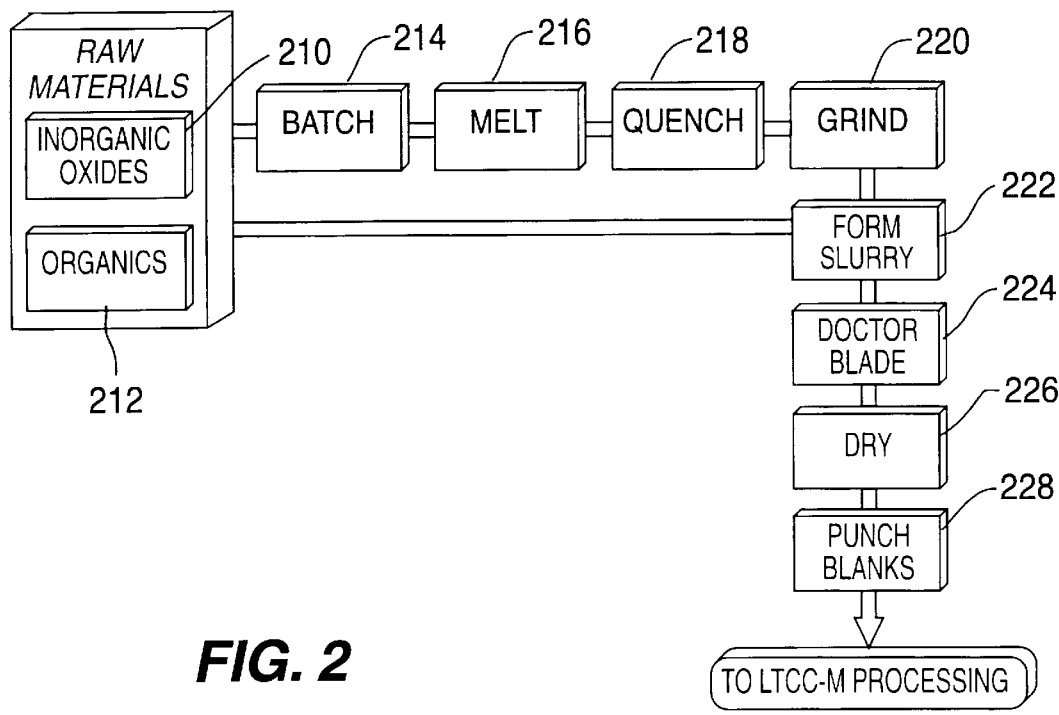
FIG. 2 is a flow chart showing the method of making the green tapes used in making the back panel of the display.

Together with the metal core, the ceramic green tape is a chief inventory component of the back panel. As shown in FIG. 2, green tape fabrication beings with inorganic raw materials, such as MgO, $Al_2O_3$, $SiO_2$, $B_2O_3$, $P_2O_5$, PbO, ZnO, $TiO_2$ and various alkali, alkaline or heavy metal oxides or materials formed from them. The ingredients are mixed in a batch in proportions to achieve the desired properties. This batch is melted at 1400°–1700° C., and is quenched. The resulting glass is ground to form a powder. The glass powder is combined with organic binders, solvents, surfactants, and other modifier additives to form a slurry. The slurry is spread on a flat surface by a doctor blade process. The process of forming large sheets of ceramic tape is referred to as "casting". The cast tape formed by this process, including the glass powder, is easily stored in rolls.

The ingredients that constitute the tape, both the inorganic oxides and the various organics, are selected to provide desired tape properties. For a back panel formation, these tape properties include, the ability to be formed in large area casting, the ability to be embossed or scribed to form barrier ribs and the ability to maintain barrier shape during firing. Ceramic green tapes are commonly cast in sizes of one to two meters wide and several meters in length. For such large area casting, the organic binders may be formulated to provide high tear strength for handling during manufacturing. It is also desirable to ensure uniform tape thickness and homogeneity throughout the cast. The organic components may also be selected to promote uniform lamination at nominal pressures (10–10,000 $Kg/cm^2$).

The barrier ribs may be formed on the back panel by a single embossing step while the ceramic tape is in the green state, i.e., prior to firing. Proper embossing depends on a combination of plastic and visco-elastic flow properties of the laminate. These flow properties are controlled principally by the organic resins blended into the slurry used to prepare the tape, and on the particle size and distribution of the inorganic ceramic powders used in the slurry.

During firing, the organics that promote the barrier formation are quickly burned off. The remaining ceramic powders melt and crystallize. The temperature of melting and of crystallization and the rate of crystallization vary from material to material. The ceramic tape composition described below provides desired melting and crystallization properties while also providing desirable properties in the final ceramic layers, including a thermal coefficient of expansion which matches that of the metallic core.

As the ceramic materials in the tape melt during the firing process, they tend to flow. Crystallization impedes this visco-elastic flow, and promotes solidification. To maintain the barrier shapes embossed into the green tape, the ceramic powder combination desirably has a crystallization temperature just lightly above the softening point (750–850° C. for the green tape composition described below with reference to Table 1). This allows the material to become more dense at the softening point, and to flow sufficiently to develop a smooth surface. The rapid crystallization, however, causes the glass to maintain the shape and form of the barriers that were fabricated when the tape was embossed in its green state.

The thermal coefficient of expansion (TCE) of the final ceramic is controlled by combining materials with TCEs above and below the desired value. The ratio of these constituent materials is adjusted to obtain the desired TCE. Control of TCE is important to minimize stresses in the final panel and assure panel flatness after cooling. A formulation, in percent weight, which produces a green ceramic tape having a thermal coefficient of expansion compatible with that of the titanium core and the float glass front panel and having the other desired properties for a ceramic tape is shown in Table 1.

TABLE 1

| Glass 1 | 92%–95% |
|---|---|
| Forsterite | 5%–8% |

An exemplary formulation for the solid components of the ceramic green tape includes 94% Glass 1 and 6% Forsterite.

Glass 1 is a magnesium aluminosilicate glass with boron trioxide and phosphorous pentoxide added as nucleating agents and is melted separately at 1550° C. for approximately an hour and rapidly quenched to form glass which is subsequently - ground to a powder using the standard comminution processes. Glass 1 has been previously disclosed in U.S. patent application Ser. No. 09/001167 filed Dec. 30, 1997 which claims the priority of U.S. patent application Ser. No. 60/044310 filed Apr. 25, 1997. The general formulation for the Glass 1 is shown in Table 2:

TABLE 2

| ZnO | 15–50 |
|---|---|
| MgO | 10–45 |
| $B_2O_3$ | 5–30 |
| $SiO_2$ | 10–45 |

An exemplary specific formulation of Glass 1 is shown in Table 3 by percent weight.

TABLE 3

| ZnO | 30 |
|---|---|
| MgO | 25 |
| $B_2O_3$ | 20 |
| $SiO_2$ | 25 |

The glass composition set forth in table 1 is mixed with organic solvents in the proportion, by percent weight, shown in Table 4.

TABLE 4

| Glass composition (Table 1) | 65–75 |
|---|---|
| Solvent 1 | 10–16 |
| Resin 1 | 12–18 |

The formulations for Solvent 1 and Resin 1, by percent weight, are given in Tables 5 and 6 below.

TABLE 5

| Solvent 1 | |
|---|---|
| methyl ethyl ketone | 46.90 |
| Ethanol | 46.90 |
| Fish oil | 6.20 |

TABLE 6

| Resin 1 | |
|---|---|
| methyl ethyl ketone | 36.10 |
| Ethanol | 36.10 |
| #160 plasticizer | 11.10 |
| B-98 resin | 16.70 |

The process for forming the ceramic green tape is shown in FIG. 2. This process begins with the raw materials. As described above Glass 1 is prepared by mixing (step 214) a batch, melting (step 216) the batch at the temperatures and for the times described above, quenching (step 218) the molten mixture to form a glass and grinding the glass to form a powder. In the exemplary embodiment, Glass 1 is ground to have a particle size of between 8 to 12 microns. The filler material, Forsterite, is ground to have a particle size of approximately 6.5 microns.

Next, at step 222, the ground glasses and fillers are combined in a beaker with the organics in the proportions shown in Table 4 to form a slurry. For this step, the glass powder mixture is thoroughly mixed first with Solvent I and then with Resin 1. The slurry mixture is then milled, also in step 222, by placing the slurry in a one liter milling jar containing $ZrO_2$ rollers and placing the jar on a roll mill for at least two hours. The slurry is then strained into a container to remove the rollers and de-aired for one minute while stirring. Incomplete de-airing results in pinholes or small bubbles in the cast tape. Excessive de-airing results in the removal of too much of the solvent, which results in a slurry that is too viscous.

This slurry is formed into sheets at step 224 using a doctor blade process. The first step in this process is to measure the viscosity of the de-aired slurry. A typical viscosity is between 700 and 1100 cps. Next, a 3-mil Mylar sheet is prepared by applying a silicon release agent to the top surface of the sheet. Next, the doctor blade is adjusted to obtain the desired thickness of the tape. A blade opening of 15 mils is used to obtain a green tape thickness of 8 mils. The slurry is then poured into the tape caster. Initially, the Mylar is pulled at a speed of 20 cm/min until the slurry appears at the output area of the tape caster. Then the pull speed is increased to 90 cm/min. At step 226, the sheets are dried for at least 30 minutes before being removed from the tape caster. As a quality control step, the cast tape is viewed on a light box for imperfections and the thickness and density of the tape are measured at several points along the cast tape. At step 228, the green tape is punched to prepare blanks which may have conductor paste and fill paste applied to them to form electrodes, vias and interconnecting circuitry, at step 118 of FIG. 1, before being laminated, at step 120, to the metal core.

The composition of a suitable conductor paste is set forth in Tables 7 and 8 as a percent weight formulation and the composition of a suitable fill paste is set forth in Table 9 also as a percent weight formulation.

TABLE 7

| Conductor Paste | |
|---|---|
| Ag Powder EG (~7.6 microns) | 82.40 |
| Solvent 2 | 16.50 |
| Lecithin | 0.55 |
| Terpineol | 0.55 |

TABLE 8

| Solvent 2 | |
|---|---|
| Ethyl cellulose N-300 | 3.80 |
| Ethyl cellulose N-14 | 7.50 |
| Butyl carbitol | 53.20 |
| Dodecanol | 35.50 |

TABLE 9

| Conductor Fill Paste | |
|---|---|
| Ag Powder EG (~7.6 microns) | 55.90 |
| PAS glass | 22.30 |
| Hypermer PS-2 | 1.20 |
| EC N-300 | 0.69 |
| Butyl carbitol | 7.91 |
| Elvacite 2045 | 1.80 |
| Terpineol | 5.40 |
| #160 plasticizer | 3.60 |
| Thixotrol | 1.20 |

In the above conductor fill paste compound, PAS glass is 50% PbO, 40% $SiO_2$ and 10% $Al_2O_3$, all by weight. In the composition, the PAS glass is first made and ground into a powder before being used in the conductor paste.

These conductor pastes are screen-printed onto the green tape prior to the barrier formation process. The inventors have determined that these pastes withstand the barrier formation processes, particularly the high pressures, without breaking any conductor traces while maintaining good electrical conductivity. The fill paste formulation set forth in Table 10 matches the sintering characteristics and the coefficient of thermal expansion of the glass-ceramic formulation described above with reference to Tables 1 to 3. The electrodes may be printed prior to or after the lamination to the metal core.

The inventors have determined that a laminate made using the green tape formulation set forth in Table 4 exhibits a good thermal expansion coefficient match to the titanium metal. The ceramic produced when the green tape and metal core are cofired has a dielectric constant of approximately 7. It also exhibits rheological properties, when in the green state, which enable groove formation suitable for the preparation of barrier ribs. Typical barrier ribs of up to about 400 microns in height may be formed on the green tape of about 210 micron thickness, as described below with reference to FIGS. 3A and 3B, resulting in barrier ribs having a height of about 270 microns on the co-fired back plate.

It is well known in display technology that a black background beneath the red, green and blue phosphors enhances contrast in displayed images. This aspect of display technology may be implemented in a relatively straight-forward manner by adding a black coloring agent, such as cobalt oxide (CoO) into the formulation of the top layer of the tape or by spraying or screen painting a paste of the black coloring agent onto the top layer of the tape either before or after the co-firing of the panel at step 124 (shown in FIG. 1) but before the application of the phosphors at step 126.

At step 122 of FIG. 1, after the green tape has been laminated to attach it to the metal core, it is embossed to form the barrier ribs.

Figure 3A:
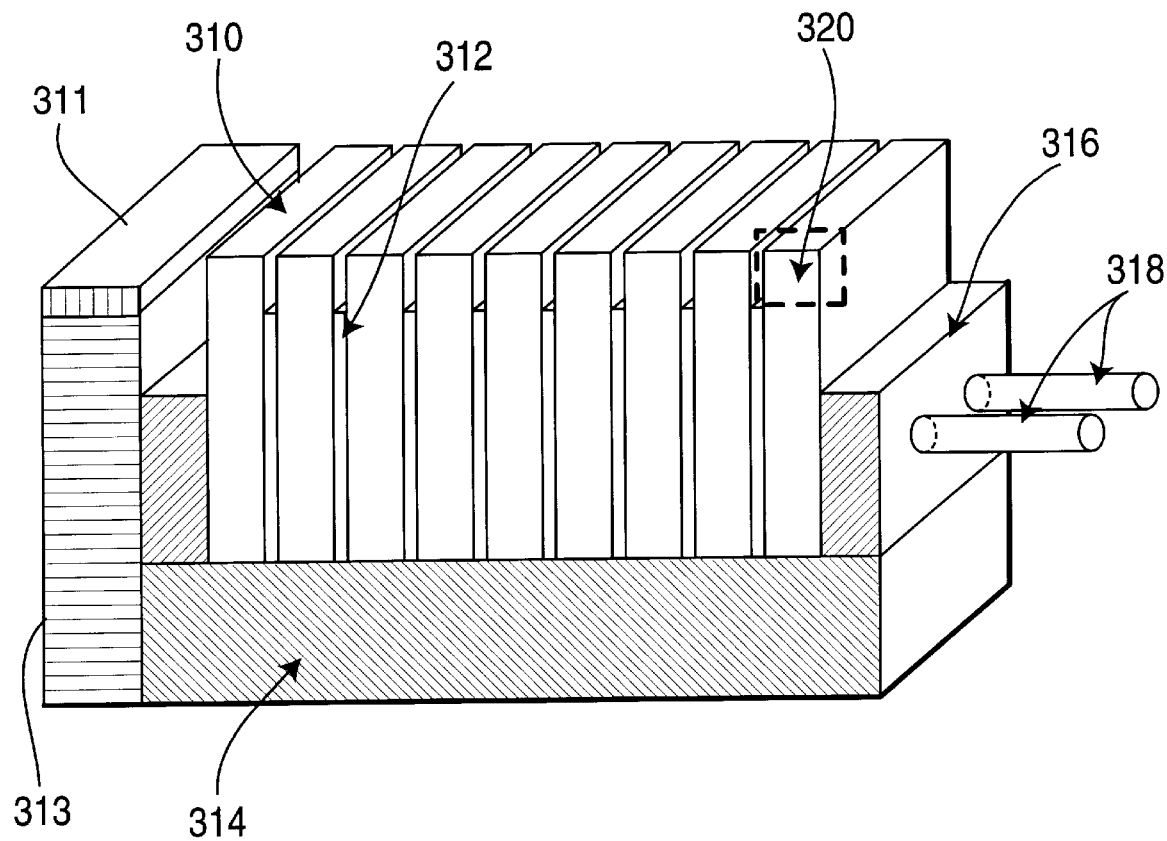
FIG. 3A is an isometric drawing of an embossing tool suitable for use in forming barrier ribs for a plasma display.

FIG. 3A is an isometric drawing of an embossing tool or die which may be used to form barrier ribs in the laminated green tape structure. The die is a "negative" of the desired barrier structure in the green tape. The die shown in FIG. 3A is made by stacking together sheet metal strips which alternate in width and thickness. The thickness of the different strips determines the die pitch and the difference in the width of the strips defines the rib height. A die of this type may be fabricated from any material which can be formed into strips, including stainless or tool steel, plastics or ceramics.

The exemplary die includes alternating thick strips 310 and thin strips 312. The thick strips 310 define the channels between the barrier ribs in the finished panel. Thus, the thick strips 310 are wider than the thin strips 312 to allow the barrier ribs to form between the thick strips. These wider strips desirably have smooth surfaces to help the green ceramic material to flow and release easily during the embossing process. The edge regions of the wider strips (e.g. the region 320) may also have a shape that is modified from rectangular (e.g. rounded) to provide an edge with good release characteristics and which also achieves the desired barrier shape in the green tape after embossing.

The two sets of metal strips having the same length but different thickness and width may be prepared, for example, using electro discharge machining (EDM) to achieve the desired smoothness. The strips are stacked alternately, one strip at a time from each set. The strips are desirably accurately positioned, for example, using a flat metal plate 314 and/or metal rails 318. The stack is then compressed from its sides to ensure good packing and uniform pitch. The stack may be secured in the compressed dimension by any of several known methods, such as welding, soldering, gluing or packing into a mandrel 316. Because the thickness tolerance of the metal strips is additive throughout the stack, a compressible metal (e.g. annealed copper) may be used for the thin strips of smaller width. The compressibility of these metal strips compensates for thickness tolerances.

The wider strips may be machined to modify their edges either before or after they are stacked to achieve angles that readily release the green tape during the embossing process. The edges may be modified by any of a number of known techniques such as glass bead blasting, sand blasting and lathe machining.

A die prepared as described above has several advantages over a conventional die, machined from a single piece of metal. It may be made very large and, thus, accommodate large-screen plasma displays; it may also be easily repaired or modified resulting in a longer lifetime than single-piece dies.

The die is pressed against the green tape, preferably after the green tape has been laminated to the metallic core in order to form the barrier ribs. When the laminated tape is embossed, the metal core forms a rigid substrate. The inventors have determined that the presence of this rigid substrate significantly enhances perpendicular flow of the green ceramic material, allowing it to more readily take the shape of the embossing tool. The inventors have also determined that it is advantageous for the pressing operation to be pulsed, that is to say, repeatedly pressing the die against the laminated green tape at relatively high pressure, separated by relaxation periods of zero pressure, all at a constant temperature. The application of high pressure forces the green tape into the voids between the thick bars of the die to form the barrier ribs. The relaxation periods cause the particles of the green tape to move apart, allowing the organic material to flow back between them, decreasing the viscosity of the green tape. Using this technique, the maximum pressure applied to the laminated green tape structure is decreased which decreases deformation and wear on the die. Barrier rib aspect ratios as high as 10 to 1 may be readily achieved using the pulsed embossing technique described above.

It is desirable, using this technique, for there to be a complete release of the tape from the die. One method by which this may be achieved is to place elastic spacers 311 under the die but outside of the embossing area. These spacers are mounted on supports 313 which are attached to the mandrel. The spacers are compressed by the embossing pressures and provide a lifting force on the tool when the pressure is released. The inventors have determined that the pressurization of the elastic spacers prior to pressing the tool into the green ceramic also improves pressure distribution in the assembly and, thus, makes the height of the embossed barriers more uniform over the entire embossed area. It is contemplated that springs (not shown) may be used instead of elastic spacers.

Figure 3B:
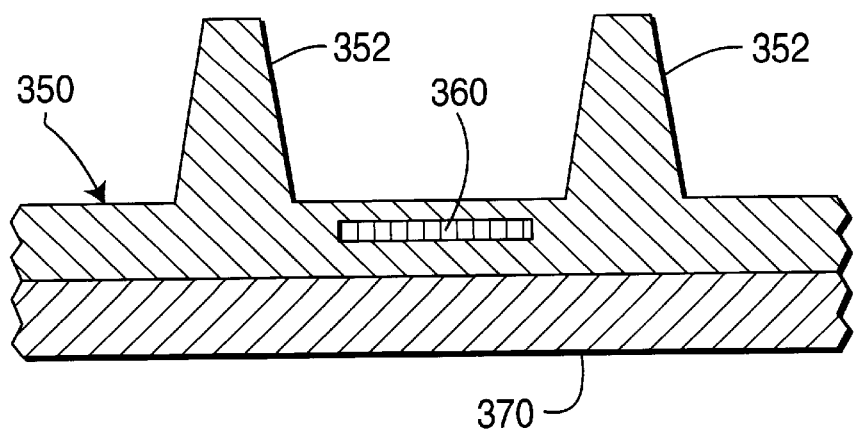
FIG. 3B is an elevation view of barrier ribs formed in a plasma display.

FIG. 3B shows an exemplary barrier rib structure that may be achieved using the embossing technique described above. The structure includes an embossed green tape structure 350 which includes the barrier ribs 352 and a column electrode 360. The green tape structure is laminated to the metallic core 370.

Figure 4A:
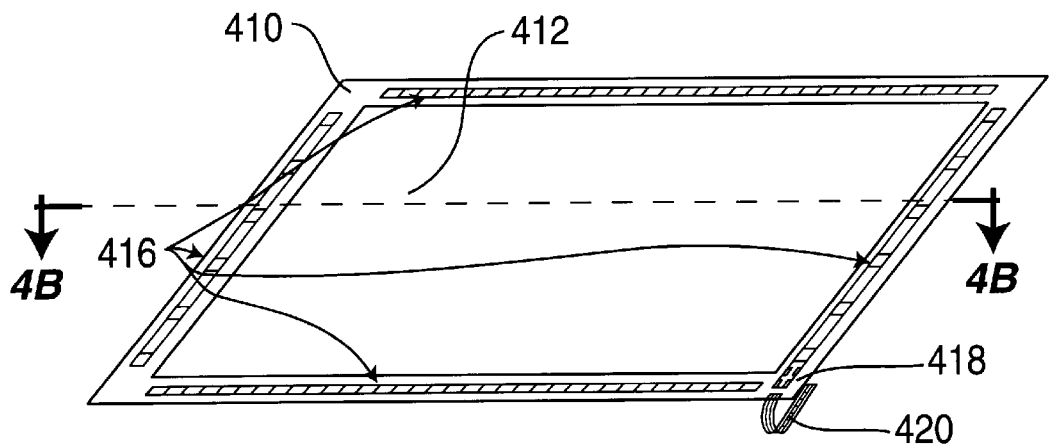
FIG. 4A is an isometric view of an assembled plasma panel.

FIG. 4A is an isometric view of an exemplary plasma display panel according to the present invention. The exemplary panel includes a back panel 410, front panel 412, microstrip multi-layer low-temperature cofired ceramic (LTCC) display driver circuits 416, interface circuit 418 and a connection cable 420.

Figure 4B:
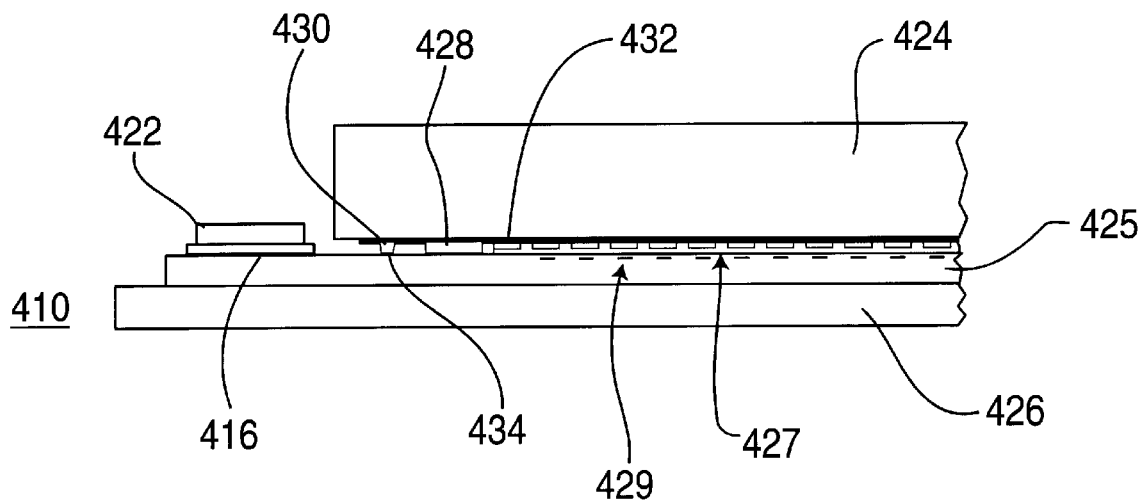
FIG. 4B is a cut-away view of the panel shown in FIG. 4A along the lines 4B—4B.

FIG. 4B is a cut-away side plan view taken along a line taken along a row of the display (line 4B—4B shown in FIG. 4A). This figure illustrates the structure of a plasma display panel according to the subject invention. The panel includes a back panel 410 which includes a titanium core 370, and a laminated, embossed and cofired ceramic structure 350 that forms the barrier ribs 352 for the display as well as the substrate 416 on which the electronics 422 that control the display are mounted. Embedded in the ceramic structure 350 are the column electrodes 360 which extend into the drawing shown in FIG. 4B. Above each electrode, on the surface of the embossed ceramic back panel is the phosphor (not shown) which is excited in order to emit colored light (red, green or blue). Above the back panel 410 is the front panel 424. The front panel includes a row electrode 432 which is connected to the circuitry 422 and 416 by a solder bead 430 which forms an electrical connection 434 to the circuitry 416 using conductors that are painted onto the ceramic back plate at step 118 of FIG. 1. The front panel is bonded to the back panel by a frit seal 428.

The front panel is bonded to the back panel using a frit material which is applied to the periphery of one or both panels. The panels are supported together and heated to a sufficiently high temperature to melt the frit material. The panels are then cooled, whereupon the frit solidifies and forms a gas-tight seal. The frit sealing temperature is typically in the range of 350° to 450° C.

While the invention has been described in terms of an exemplary embodiment, it is contemplated that it may be practiced as described above with modifications within the scope of the appended claims.

The invention claimed is:

1. A method for forming a back panel for a plasma display device comprising the steps of:
   preparing a green ceramic tape which has a temperature coefficient of expansion (TCE) which matches the TCE of a metal core;
   preparing a plurality of green tape blanks;
   laminating the green tape blanks;
   embossing the laminated green tape blanks using an embossing die by applying pulsed pressure to the embossing die to form barrier ribs on the green tape ceramic; and cofiring the bonded formed green ceramic tape and metal core to form the back panel.

2. The method of claim 1 further including the steps of:

cutting the green ceramic tape into a plurality of blanks each of which conforms to the metal core in shape;

applying conductive ink to ones of the green ceramic tape blanks to form electrode structures; and laminating the green ceramic tape blanks to the metal core prior to the embossing step.

3. The method of claim 2 further including the step of applying a lead borosilicate glass to the metal core before laminating the green tape blanks to the metal core wherein the lead borosilicate glass consists of boron oxide between about 10 and 15 weight percent, lead oxide between about 70 and 80 weight percent, and silicon dioxide between about 10 and 15 weight percent.

4. The method of claim 2 further including the steps of:

forming further strips of green ceramic tape into a circuit module strip, the circuit module strip including circuitry which connects driver electronics to the electrode structures formed on the green ceramic tape; and attaching the circuit module strip to the green ceramic tape blanks prior to the laminating step such that the circuit module strip is laminated and cofired with the green ceramic tape blanks in the laminating and cofiring steps respectively.

5. The method of claim 4 further including the step of attaching integrated circuit driver components to the circuit module strips after the cofiring step.

6. The method of claim 1 wherein the step of preparing a green ceramic tape includes the step of grinding a glass compound to have particle sizes of between 8 and 12 microns.

7. A back panel for a plasma display device comprising:

a metallic core having a temperature coefficient of expansion (TCE);

a ceramic structure bonded to the metallic core, the ceramic structure having a TCE that matches the TCE of the metallic core, the ceramic structure having a formulation is Glass 1 between about 92 and 95 percent weight and Forsterite between about 5 and 8 percent weight and wherein Glass 1 has a formulation defined by percent weight as ZnO between about 15 and 50 percent weight, MgO between about 10 and 45 percent weight, $B_2O_3$ between about 5 and 30 percent weight, and $SiO_2$ between about 10 and 45 percent weight.

8. The back panel of claim 7 wherein the formulation of the ceramic structure is Glass 1 of about 94 percent weight and Forsterite of about 6 percent weight; and the formulation of Glass 1 is ZnO of about 30 percent weight, MgO of about 25 percent weight, $B_2O_3$ of about 20 percent weight and $SiO_2$ of about 25 percent weight.

9. The back panel of claim 7 wherein the metallic core is made from Titanium.

10. A green ceramic tape for use in forming embossed structures having a formulation defined by percent weight as Glass composition of about 70.30 percent weight, Solvent of about 13.80 percent weight, and Resin of about 15.90 percent weight;

wherein the Glass composition is Glass 1 between about 92 and 95 percent weight and Forsterite between about 5 and 8 percent weight; and wherein Glass 1 has a formulation defined by percent weight as ZnO between about 15 and 50 percent weight, MgO between about 10 and 45 percent weight, $B_2O_3$ between about 5 and 30 percent weight, and $SiO_2$ between about 10 and 45 percent weight, the solvent is comprised of methyl ethyl ketone of about 46.90 percent weight, Ethanol of about 46.90 percent weight, and Fish oil of about 6.20 percent weight, and the resin is comprised of methyl ethyl ketone of about 36.10 percent weight, Ethanol of about 36.10 percent weight, #160 plasticizer of about 11.10 percent weight, and B-98 resin of about 16.70 percent weight.

* * * * *